July 2, 1968 J. T. BOLLJAHN ET AL 3,391,356

STRIP-LINE FILTER

Filed June 30, 1964

INVENTORS,
JOHN T. BOLLJAHN, (DECEASED)
by: HARRIETTE BOLLJAHN,
executrix.
GEORGE L. MATTHAEI By: Harry M. Saragovitz,
Edward J. Kelly, Herbert Berl &
Julian C. Keppler ATTORNEYS.

United States Patent Office 3,391,356
Patented July 2, 1968

3,391,356

STRIP-LINE FILTER

John T. Bolljahn, deceased, late of Palo Alto, Calif., by Harriette Bolljahn, executrix, Palo Alto, Calif., and George L. Matthaei, Menlo Park, Calif., assignors to the United States of America as represented by the Secretary of the Army Filed June 30, 1964, Ser. No. 379,414
The portion of the term of the patent subsequent to June 20, 1984, has been disclaimed
11 Claims. (Cl. 333—73)

ABSTRACT OF THE DISCLOSURE

A strip-line microwave band-pass filter comprising a pair of spaced parallel ground planes separated by and in electrical contact with a pair of spaced parallel metallic blocks. A comb-line is included intermediate the ground plane. The comb-line comprises a plurality of parallel arranged spaced metallic bars affixed at one end to one of the metallic block spaces and extending toward the other metallic block spacer but terminated short thereof. The free ends of the metallic bars are terminated by respective capacitor plates. The metallic block opposite the capacitor plates includes as an integral part thereof respective adjacent shiftable block sections, one shiftable section being provided for each capacitor plate. The lumped capacitance $C_k$ between each of the bars and the shiftable blocks is adjusted such that the bars will be substantially $\lambda_0/8$ long at resonance where $\lambda_0/8$ is the wavelength of the mid-band frequency of the band-pass of the filter.

This invention relates to microwave band-pass filters and more particularly to a comb-line band-pass filter of narrow or moderate bandwidth.

Strip transmission line filters are known to comprise a resonator assembly disposed between two ground planes. It is usually desirable in such filters to provide strong stop-bands and to make the stop-band above the primary pass-band as broad as possible.

It is an object of the present invention to provide an improved strip-line microwave band-pass filter.

It is another object of the present invention to provide an improved strip-line microwave band-pass filter which is compact and has relatively non-critical manufacturing tolerances.

It is still another object of the present invention to provide an improved strip-line microwave band-pass filter characterized by relatively broad stop-bands above the primary pass-band.

In accordance with the present invention there is provided a strip-line microwave filter adapted to pass a prescribed band of frequencies which includes a pair of spaced parallel ground planes and a pair of spaced parallel metallic blocks intermediate the ground planes and in electrical contact therewith. Also included is a comb-line comprising a plurality of parallel arranged spaced resonator bars, affixed at one end to one of the metallic block spacers and extending towards said other metallic block spacer but terminating short thereof so that there is a prescribed lumped capacitance $C_k$ between the respective free ends of the resonator bars and said other metallic block spacer. The length of the resonator bars is made less than one-quarter wavelength, preferably one-eighth wavelenth, of the mid-band frequency of the primary band-pass. Included further are discrete, non-resonant microwave energy coupling means intermediate the metallic block spacers and spaced from the first and last of the resonator bars.

For a better understanding of the invention, together with other and further objects thereof, reference is had to the following description taken in connection with the accompanying drawing in which.

Figure 1:
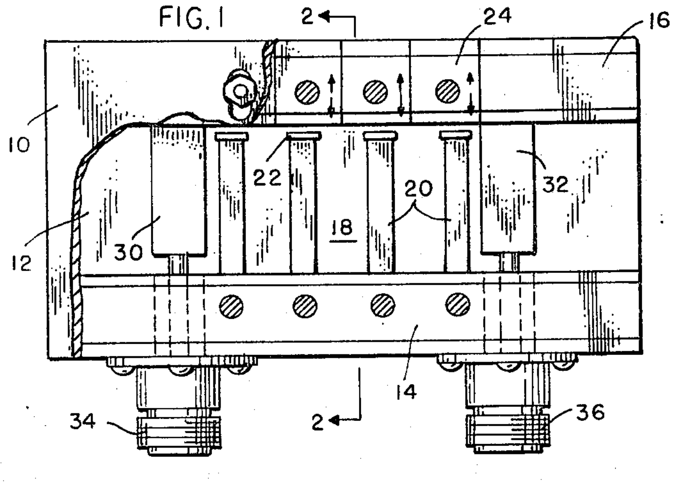
FIG. 1 is a side elevation of the comb-line filter with one ground conducting plane torn away.
Figure 2:
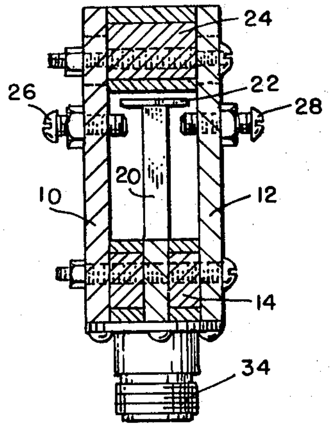
FIG. 2 is a cross-section taken along the lines 2—2 of FIG. 1.

Referring now to FIG. 1 and FIG. 2 of the drawing, there is shown at 10 and 12 a pair of spaced parallel ground planes hereinafter referred to as upper and lower ground planes, respectively. Parallel arranged metallic spacer and short-circuiting blocks 14 and 16 are provided intermediate the ground planes 10 and 12 and are in electrical contact therewith. Centrally positioned intermediate upper and lower ground planes 10 and 12 midway therebetween is a comb-line 18. As shown, comb-line 18 comprises spaced parallel arranged metallic bars 20 which are affixed at one end to block 14 and extend toward block 16 but terminate short thereof so that the free ends of bars 20 are spaced from block 16. The metallic bars 20 are made less than $\lambda_0/4$ where $\lambda_0$ is the wavelength of the mid-band frequency of the frequency band-pass of the filter and are preferably made $\lambda_0/8$ long, or less, as hereinbelow described. The free ends of bars 20 are terminated by metallic capacitor plates 22 which in turn are spaced from metallic block 16 and are parallel thereto. As shown, metallic block 16 includes as an integral part thereof respective adjacent shiftable block sections 24, one shiftable section being provided for each of the metallic bars 20. Any suitable means may be provided to individually and independently position each of the shiftable block sections 24 only in the transverse direction towards or away from their associated capacitor plates 22. Conventional tuning screws as at 26 and 28 which extend through opposite ground planes 10 and 12 are provided for each of the bars 22. With such an arrangement, the comb-line 18 comprises a TEM-mode strip-line between ground planes 10 and 12. The lumped capacitance $C_k$ between each of the bars 20 and block 16 is adjusted by means of the shiftable block sections 24 to be sufficiently large so that the bars 20, hereinafter referred to as resonator line bars, will be substantially $\lambda_0/8$ long at resonance. To adjust the capacitive loading of each resonator line bar, its associated sliding block 24 is first adjusted to give slightly less than the required resonator capacitance, and then the oppositely disposed associated tuning screws 26 and 28 are used to bring the resonator to the exact desired frequency. The screws 26 and 28 are known in the art as general-susceptance tuning screws whose operation as a fine tuning mechanism is described on pp. 499–507 of "Microwave Transmission Circuits" (1948), vol. 9, of the Massachusetts Institute of Technology Radiation Laboratory Series. The respective input and output coupling bars 30 and 32 are at opposite ends of the strip-line comprising the resonator line bars 20, spaced therefrom and coplanar therewith. Corresponding ends of coupling bars 30 and 32 are connected to metallic block 16, and the respective free ends of bars 30 and 32 are coupled to and terminated by conventional coaxial type connectors 34 and 36, respectively, which extend through metallic block 14. Thus, in the structure shown in FIG. 1, each bar element 20 of comb-line 18 serves as a strip-line resonator except for the input and output bar elements 30 and 32 which are not resonators but simply part of impedance transforming sections at the input and output ends of the filter. The resonator line bars 20 are assumed to have the same $t/_b$ ratio, where $t$ is the thickness of each bar and $b$ the spacing between ground planes. The other dimensions and the spacing between resonator line bars may be readily obtained in the manner set forth by W. J. Gestinger in I.R.E. Transactions on Microwave Theory and Technique, January 1962, pp. 63–72.

In FIG. 1, coupling between resonator line bars 20 is achieved by way of the fields fringing between adjacent resonator elements, which in this case is predominantly magnetic.

The broadness of the stop-band above the primary pass-band on this type of filter is readily apparent inasmuch as the second pass-band occurs when the resonator line bar elements are somewhat over one-half wavelength long. Thus, if the resonator line bars are $\lambda_o/8$ long at the primary pass-band, the second pass-band will be centered slightly over four times the frequency of the center of the primary pass-band. Another property of this type of filter is that, in theory, the attenuation through the filter will be infinite at the frequency for which the resonator line bars are one-quarter wavelength long. Because of this property, the attenuation above the primary pass-band will be very high and, depending on what electrical length the resonator line bars have at the primary pass-band center, the rate of cut-off on the upper side of the pass-band can be made unusually steep. The closer to $\lambda_o/4$ long the resonator line bars are at the primary pass-band center, the steeper the rate of cut-off will be above the primary pass-band.

Figure 3:
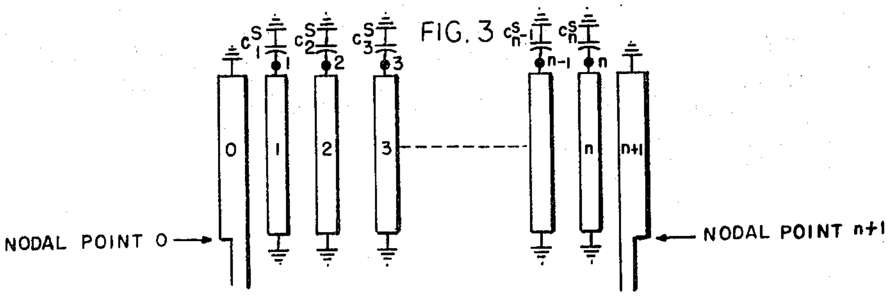
FIG. 3 is a schematic representation of the comb-line filter shown in FIG. 1.

FIG. 3 is a schematic representation of the comb-line filter shown in FIG. 1. In FIG. 3, lines 1 to $n$ and their associated capacitances, $C_1^s$ to $C_n^s$, constitute resonators, while lines 0 and $n+1$ are not resonators but form part of the impedance transforming input and output sections at the ends of the filter corresponding to bars 30 and 32 of FIG. 1.

Figure 4:
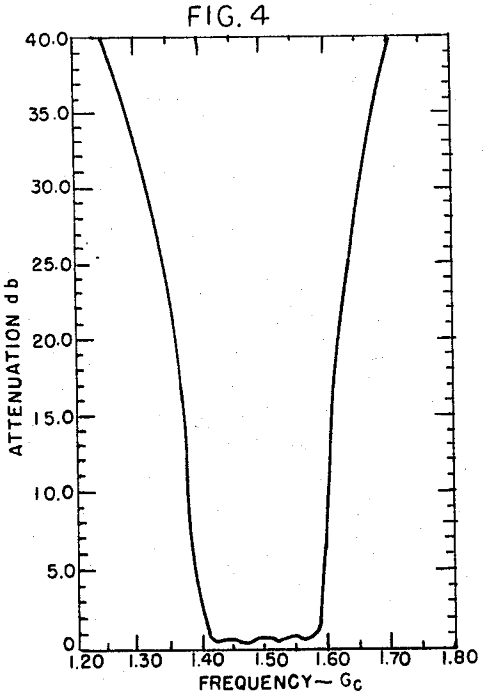
FIG. 4 is a curve illustrating the measured attenuation characteristic of the filter shown in FIG. 1.

FIG. 4 is a curve showing the measured attenuation characteristic of a filter constructed in accordance with FIG. 1 and designed with four strip-line resonator elements resonant at a mid-band frequency of 1.5 gc.

The advantages of the comb-line filter hereinabove described may be summed up as follows:

(1) They are compact.

(2) They have strong stop-bands and the stop-band above the primary pass-band can be made to be very broad.

(3) The cut-off on the high side of the pass-band can be made very steep.

(4) The proper couplings between resonator line bars can be maintained in manufactured filters without unreasonable tolerance requirements.

(5) Dielectric loss can be eliminated since such comb-line filters can be fabricated without the use of dielectric support materials.

While there has been described what is at present considered to be the preferred embodiment of this invention, it will be obvious to those skilled in the art that various changes and modifications may be made therein without departing from the invention, and it is therefore aimed in the appended claims to cover all such changes and modifications as fall within the true spirit and scope of the invention.

What is claimed is:

1. A strip-line microwave filter adapted to pass a prescribed band of frequencies comprising a pair of spaced parallel ground planes, spaced parallel metallic blocks intermediate said ground planes and in electrical contact therewith, a comb-line comprising a plurality of parallel arranged spaced metallic bars affixed at one end to one of said metallic blocks and extending towards the other metallic block but terminating short of said other block, each of said metallic bars being less than one-quarter wavelength of the mid-band frequency of said band-pass, and discrete microwave energy coupling means intermediate said metallic blocks and spaced from the first and last of said metallic bars.

2. The filter in accordance with claim 1 wherein the respective microwave energy coupling means comprises two metallic bars each having one end affixed to said other metallic block spacer, and two coaxial lines having respective center conductors extending through said one metallic block spacer and affixed to the respective free ends of said microwave energy coupling bars.

3. A strip-line microwave filter adapted to pass a prescribed band of frequencies comprising a pair of spaced parallel ground planes, spaced parallel metallic blocks intermediate said ground planes and in electrical contact therewith, a comb-line comprising a plurality of parallel arranged spaced metallic bars affixed at one end to one of said metallic blocks and extending towards the other metallic block but terminating short of said other block, each of said metallic bars being less than one-quarter wavelength of the mid-band frequency of said band-pass, said other metallic block including a plurality of adjacent moveable sections equal in number to said metallic bars and arranged such that the respective free ends of said bars is capacitively coupled to a respective one of said moveable sections, and discrete microwave energy coupling means intermediate said metallic blocks and spaced from the first and last of said metallic bars.

4. The filter in accordance with claim 3 wherein said spaced metallic bars are parallel to and equally spaced from said ground planes, and said microwave energy coupling means is coextensive with said spaced metallic bars.

5. The filter in accordance with claim 3 wherein the respective microwave energy coupling means comprises two metallic bars each having one end affixed to said other metallic block spacer, and two coaxial lines having respective center conductors extending through said one metallic block spacer and affixed to the respective free ends of said microwave energy coupling metallic bars.

6. The filter in accordance with claim 3 wherein said comb-line metallic bars are one-eighth wavelength of the mid-band frequency of said band-pass.

7. A strip-line microwave filter adapted to pass a prescribed band of frequencies, a pair of spaced parallel ground planes, spaced parallel metallic blocks intermediate said ground planes and in electrical contact therewith, a plurality of parallel arranged spaced resonator bars affixed at one end to one of said metallic blocks and extending towards the other metallic block but terminating short of said other block, respective capacitor plates terminating the free ends of said resonator bars and in capacitive relationship with said other metallic block, and discrete microwave energy coupling means intermediate said metallic blocks and spaced from the first and last of said resonator bars.

8. The filter in accordance with claim 7 wherein said other metallic block includes a plurality of adjacent moveable sections equal in number to said resonator bars and arranged such that the respective capacitor plates are in capacitive relationship to a respective one of said moveable sections and wherein said resonator bars are less than one-quarter wavelength of the mid-band frequency of said band-pass.

9. The filter in accordance with claim 7 wherein said resonator bars are one-eighth wavelength of the mid-band frequency of said band-pass.

10. The filter in accordance with claim 7 wherein said resonator bars are parallel to and equally spaced from said ground planes.

11. The filter in accordance with claim 7 wherein said microwave energy coupling means comprises two metallic bars each having one end affixed to said other metallic block spacer, and two discrete coaxial lines having respective center conductors extending through said one metallic block spacer and affixed to the respective free ends of said metallic bars.

References Cited

UNITED STATES PATENTS

| | | | |
|---|---|---|---|
| 2,819,452 | 1/1958 | Arditi et al. | 333—73 |
| 2,915,716 | 12/1959 | Hattersley | 333—73 |

| | | | |
|---|---|---|---|
| 2,945,195 | 7/1960 | Matthaei | 333—73 |
| 2,968,012 | 1/1961 | Allstader | 333—73 |
| 3,069,587 | 12/1962 | Dench | 315—3.5 |
| 3,327,255 | 6/1967 | Bolljahn et al. | 333—73 |

HERMAN KARL SAALBACH, *Primary Examiner.*

C. BARAFF, *Assistant Examiner.*